US 8,224,035 B2

United States Patent
Adachi et al.

(10) Patent No.: US 8,224,035 B2
(45) Date of Patent: Jul. 17, 2012

(54) DEVICE, METHOD AND PROGRAM FOR DETECTING EYE

(75) Inventors: Jun Adachi, Obu (JP); Hiroshi Ishiguro, Kariya (JP); Kenichi Ogawa, Kariya (JP); Yukihiko Yoshinaga, Kariya (JP); Kenichi Ohue, Toyota (JP); Shigeyasu Uozumi, Toyota (JP); Shinichi Kojima, Nisshin (JP); Satoru Nakanishi, Aichi-ken (JP); Nobuyuki Shiraki, Owariasahi (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 1257 days.

(21) Appl. No.: 11/951,691

(22) Filed: Dec. 6, 2007

(65) Prior Publication Data

US 2008/0137959 A1    Jun. 12, 2008

(30) Foreign Application Priority Data

Dec. 6, 2006  (JP) .................................. 2006-329831

(51) Int. Cl.
*G06K 9/00* (2006.01)
*G06K 9/46* (2006.01)
*G06K 9/66* (2006.01)
*A61B 3/14* (2006.01)

(52) U.S. Cl. ......... 382/117; 382/167; 382/190; 351/206
(58) Field of Classification Search .................. 382/117, 382/167, 190; 351/206
See application file for complete search history.

(56) References Cited

U.S. PATENT DOCUMENTS

| 5,926,251 | A  | * | 7/1999  | Okumura ...................... 351/209 |
| 6,055,323 | A  |   | 4/2000  | Okumura |
| 6,549,644 | B1 | * | 4/2003  | Yamamoto .................... 382/118 |
| 7,535,469 | B2 | * | 5/2009  | Kim et al. ..................... 345/419 |
| 7,792,249 | B2 | * | 9/2010  | Gertner et al. .................. 378/65 |
| 2003/0206171 | A1 | * | 11/2003 | Kim et al. ..................... 345/473 |
| 2005/0119642 | A1 |   | 6/2005  | Grecu et al. ...................... 606/5 |
| 2006/0045317 | A1 | * | 3/2006  | Adachi et al. .................. 382/118 |
| 2010/0110374 | A1 | * | 5/2010  | Raguin et al. ................. 351/206 |
| 2010/0245093 | A1 | * | 9/2010  | Kobetski et al. .............. 340/576 |

FOREIGN PATENT DOCUMENTS

| JP | 03-202045  |   | 9/1991  |
| JP | 07-181012  | A | 7/1995  |
| JP | 1995-313459 | A | 12/1995 |
| JP | 8-101915   | A | 4/1996  |
| JP | 10-044824  | A | 2/1998  |
| JP | 10-63850   | A | 3/1998  |

(Continued)

OTHER PUBLICATIONS

Japanese Office Action corresponding to Japanese Patent Application No. 2006-329831 dated May 31, 2011.

(Continued)

*Primary Examiner* — Aaron W Carter
(74) *Attorney, Agent, or Firm* — Sughrue Mion, PLLC

(57) ABSTRACT

An eye detecting device includes an image generating device for generating a face image, a nostril detecting portion for detecting a nostril in the face image, an eye searching area setting portion for setting an eye searching area in the face image based on a position of the nostril detected by the nostril detecting portion, and an eye searching portion for searching an eye within the eye searching area set by the eye searching area setting portion.

12 Claims, 12 Drawing Sheets

FOREIGN PATENT DOCUMENTS

| | | | |
|---|---|---|---|
| JP | 11-039469 | A | 2/1999 |
| JP | 11-066320 | A | 3/1999 |
| JP | 2000-067225 | A | 3/2000 |
| JP | 2000-123188 | A | 4/2000 |
| JP | 2000-137792 | A | 5/2000 |
| JP | 2000-339457 | A | 12/2000 |
| JP | 3143819 | B2 | 1/2001 |
| JP | 2001-307076 | A | 11/2001 |
| JP | 3444115 | B2 | 6/2003 |
| JP | 2005-25568 | A | 1/2005 |
| JP | 3312562 | B2 | 5/2005 |
| JP | 2005-296349 | A | 10/2005 |
| JP | 2006-065673 | A | 3/2006 |

OTHER PUBLICATIONS

Japanese Office Action issued in JP 2007-071524 dated Jan. 20, 2009 (10 pages).

Japanese Office Action issued in JP 2007-063149 dated Feb. 3, 2009 (14 pages).

International Search Report issued in PCT/JP2007/073311 dated Dec. 25, 2007 (3 pages).

Song, Xinguang, "Extraction of Facial Organ Features Using Partial Feature Template and Global Constraints," The IEICE Transactions of Institute of Information and Communication Engineers, Aug. 25, 1994, J77-D-II No. 8, pp. 1601-1609.

* cited by examiner

FIG. 4A

Operator for detecting longitudinal edge

| -1 | 0 | 1 |
|---|---|---|
| -2 | 0 | 2 |
| -1 | 0 | 1 |

FIG. 4B

Operator for detecting lateral edge

| -1 | -2 | -1 |
|---|---|---|
| 0 | 0 | 0 |
| 1 | 2 | 1 |

DEVICE, METHOD AND PROGRAM FOR DETECTING EYE

CROSS REFERENCE TO RELATED APPLICATIONS

This application is based on and claims priority under 35 U.S.C. §119 to Japanese Patent Application 2006-329831, filed on Dec. 6, 2006, the entire content of which are incorporated herein by reference.

FIELD OF THE INVENTION

The present invention relates to a device, a method and a program for detecting an eye of a face based on a captured face image.

BACKGROUND

A method for measuring a direction of eyes of a person, for example a driver, or estimating an awakened level of a person, for example of a driver, by detecting a state of the driver's eyes on the basis of an image of a face (hereinafter referred to as a face image) of the driver is known. In order to determine a state of the driver's eyes, eyes in the face image of the driver need to be accurately detected.

For example, technology for detecting an opened and closed state of eyes is disclosed in JP1998044824A and in JP2001307076A. A known device disclosed in JP1998044824A detects positions of the eyes and sets a target area for executing a detection process of an open/close state of the eyes. The target area includes the positions of the eyes. Then, the known device disclosed in JP 1998044824A calculates a distribution of frequencies of density values within the target area for detecting the open/close state process, and then the known art detects an area of the eyes by determining a peak value in the distribution of the frequencies as a border value. Further, the known device disclosed in JP 1998044824A determines a maximum length of the eye area in a longitudinal direction as size of eyes.

On the other hand, the known device disclosed in JP2001307076A firstly extracts features that correspond to information of eye features in order to detect positions of the eyes of the driver. Secondly, the known art disclosed in JP2001307076A detects an eye opening level and positions of upper eyelids based on changes of detailed density of the eyes within an target area in which the eyes are included. Thirdly, the known device disclosed in JP2001307076A measures a positional distance in a vertical direction between predetermined positions of the upper eyelids and a fixed standard feature of the face around the eye, for example nostrils, on the basis of the positions of the eyes or the detailed density of the eyes. Then, the known device disclosed in JP20013007076A determines the opened/closed state of the eyes on the basis of the opening level of the eyes and the positional distance in the vertical direction.

According to the known devices disclosed in JP1998044824A and JP2001307076A, because those known devices detect the eyes within the face area it takes time to detect the eyes, and further, error may occur in detection of the eyes. For example, the known art described in the JP19980442824A detects the eyes based on the assumption that the driver has a certain shape of eyes, for example, eyes whose upper eyelids are arch-shaped. Hence, the known device disclosed in JP19980442824A may have difficulties in detecting the eyes in the face image when the driver has narrow eyes or thick eyebrows. Further, when the position of the eyes is detected on the basis of a positional relationship between the eyes and the eyebrows, or between a nose and a mouth, another process for distinguishing the eyes from the eyebrows may be needed.

On the other hand, when the method for firstly determining the eyes in the face image is adopted, it may take time before the known arts determine that the eyes are not detected because of, for example, the driver wearing sunglasses. For example, the known device disclosed in JP2001307076A detects, firstly the positions of the eyes, secondly the known device detects the nostrils based on the positions of the eyes, then the known art determines the opening level of the eyes on the basis of the positional relationship between the eyes and the nostrils. Hence, there may be possibilities that the known art mistakenly determines the eyebrows as the eyes, or nose pads of glasses as the nostrils. The known art disclosed in JP2001307076A determines the darkest density parts as the nostrils in order to distinguish the nostrils from wrinkles around the nostrils shown in the face image. Hence, the known device disclosed in JP2001307076A may not distinguish the nostrils from the nose pads of the glasses, because the nose pads of the glasses may have the similar density level as that of the nostrils.

A need thus exists to provide an eye detecting device which is not susceptible to the drawback mentioned above.

SUMMARY OF THE INVENTION

According to an aspect of the present invention, an eye detecting portion includes an image generating device for generating a face image, a nostril detecting portion for determining a nostril in the face image, an eye searching area setting portion for setting an eye searching area in the face image based on a position of the nostril detected by the nostril detecting portion, and an eye searching portion for searching an eye within the eye searching area set by the eye searching area setting portion.

According to another aspect of the present invention, an eye detecting method includes steps of a nostril detecting step for determining a nostril in a face image, an eye searching area setting step for setting an eye searching area in the face image based on a position of the nostril determined in the nostril detecting step, and an eye searching step for searching an eye within the eye search area set by the eye searching area setting step.

According to a further aspect of the present invention, a program instructs a computer to function as a nostril detecting device for determining a nostril in a face image, an eye searching area setting device for setting an eye searching area in the face image based on a position of the nostril determined by the nostril detecting device, and an eye searching device for searching an eye within the eye searching area set by the eye searching area setting device.

BRIEF DESCRIPTION OF THE DRAWINGS

The foregoing and additional features and characteristics of the present invention will become more apparent from the following detailed description considered with reference to the accompanying drawings, wherein:

FIG. 4A is a diagram illustrating an example of an operator for detecting vertical edges;

FIG. 4B is a diagram illustrating an example of an operator for detecting lateral edges;

DETAILED DESCRIPTION

Figure 1:
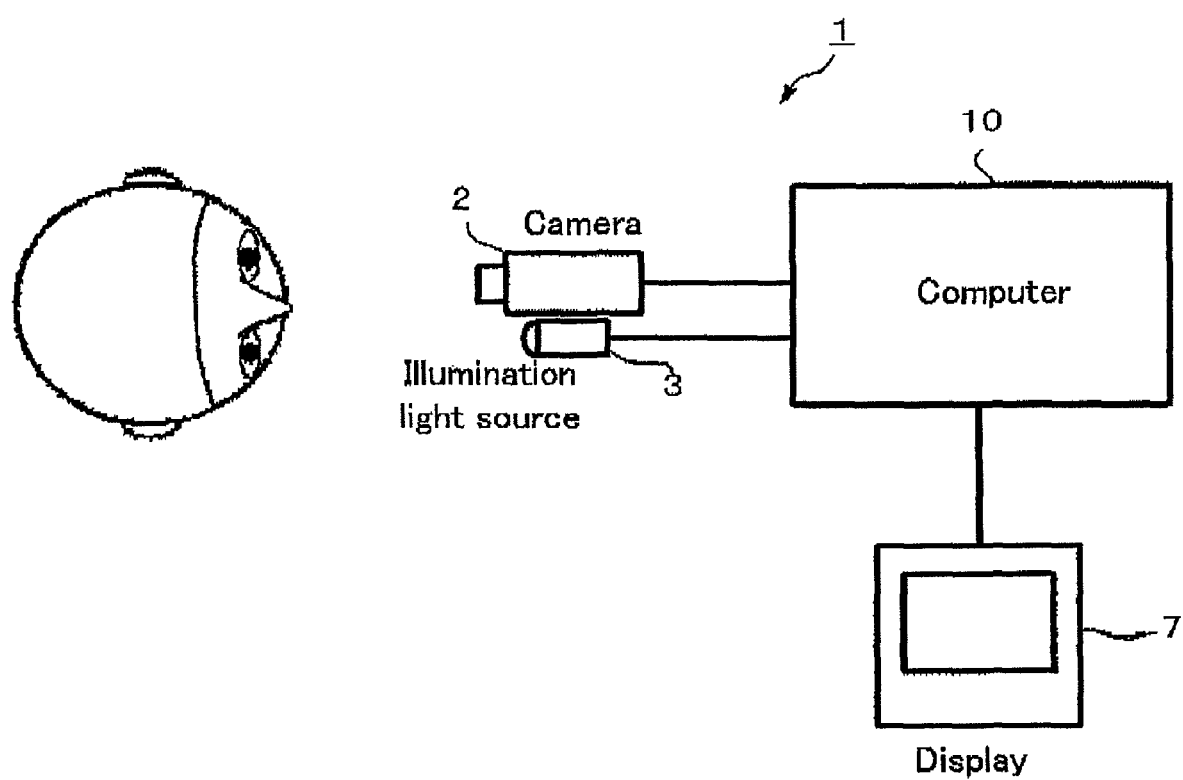
FIG. 1 is a block diagram illustrating an eye detecting device related to the embodiment.

An embodiment of the present invention will be described in detail in accordance with the attached drawings. Referring to the drawings, identical reference numeral designations may indicate the same or corresponding parts trough several views, and detailed description of the identical reference numeral designations will not repeated. FIG. 1 is a block diagram illustrating a configuration of an eye detecting device 1 related to the embodiment of the present invention. The eye detecting device 1 includes a camera 2, an illumination light source 3, a computer 10 and a display device 7. The camera 2 captures an image of a driver's face and then generates a face image (face image generating means). The illumination light source 3 illuminates the driver's face. The computer 10 detects eyes of the driver. The display device 7 is connected to the computer 10, however, the display device 7 is not a necessary component for the eye detecting device 1, and if there is no need to display, for example, the face image, a detected result or a determined result, the display device 7 may not necessarily be provided.

The camera 20, for example, converts an image formed by a lens into an electric signal by using a Charge Coupled Device (CCD), and then the camera 2 outputs an image data each of whose picture elements is digitalized. Further, the camera 2 generates, for example, a grayscale image of the face of the driver. The image data generated by the camera 2 includes not only the driver's face but also a background image behind the driver.

The display device 7 is configured with, for example, a Liquid Crystal Display (LCD), a Cathode Ray Tube (CRT) and the like. Further, the display device 7 displays, for example, a binary image that is created on the basis of the face image captured by the camera 2.

The computer 10 processes the image data generated by the camera 2, and then the computer 10 detects right and left ends of the driver's face in a width direction thereof in the face image, and further, the computer 10 detects upper and lower portions of the driver's face in a length direction in the face image. The right and left ends of the driver's face is detected, for example, on the basis of peaks of a histogram that is generated in a manner where firstly edges of the image are calculated and secondly a histogram is generated by projecting the edges in a vertical direction of the face image. Then, the computer 10 determines nostrils of the driver's face in the face image based on the detected right and left ends and the detected upper and lower portions of the driver's face. Further, the computer 10 sets an area (an eye searching area) to be searched in order to detect the eyes of the driver on the basis of positions of the nostrils, and then the computer 10 detects upper and lower eyelids of the driver's face within the eye searching area set in the face image.

Figure 2:
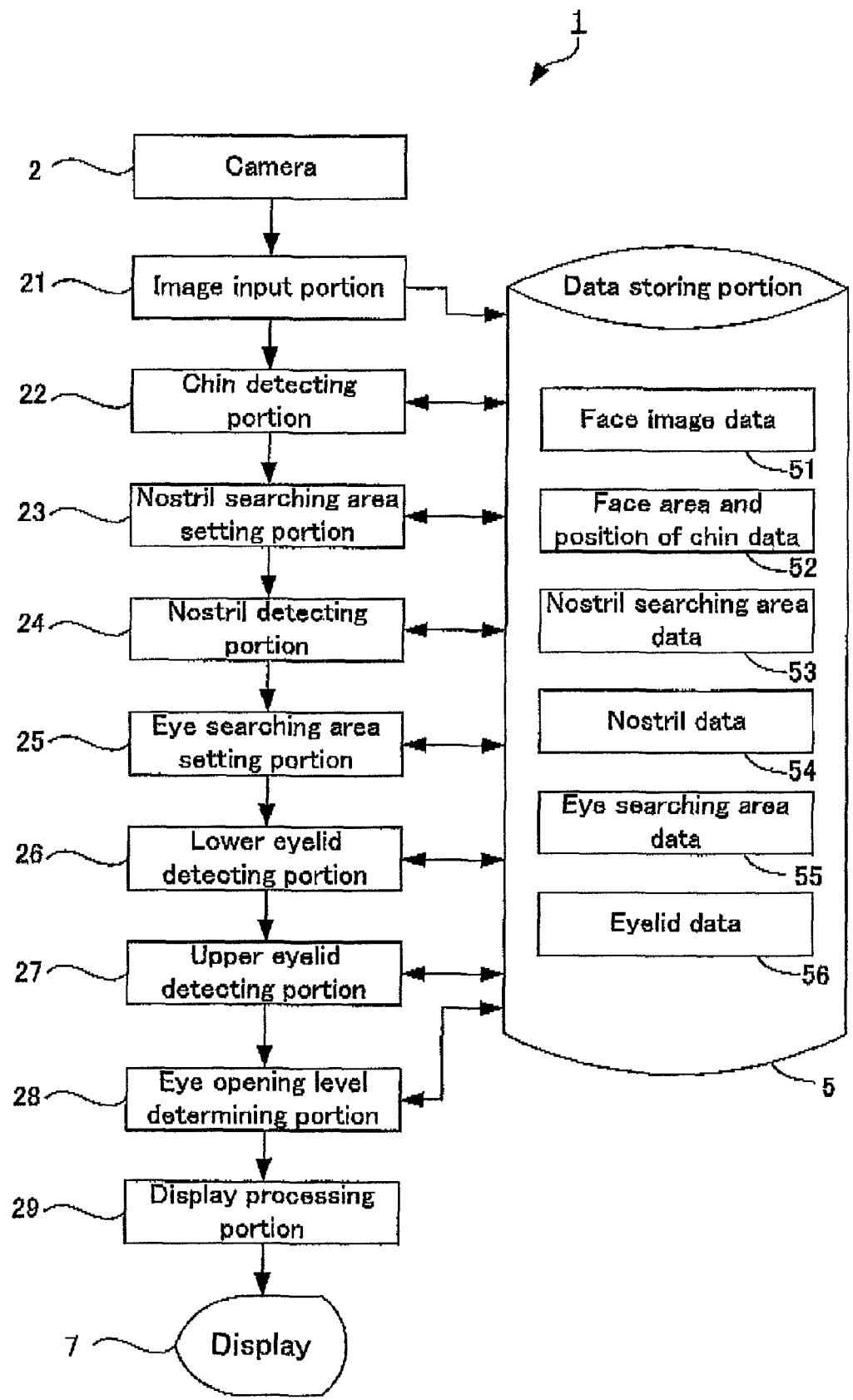
FIG. 2 is a block diagram illustrating a logical configuration of the eye detecting device of the embodiment.

FIG. 2 is a block diagram illustrating a logical configuration of the eye detecting device 1 of the embodiment. The eye detecting device 1 includes the camera 2, an image input portion 21, a chin detecting portion 22, a nostril searching area setting portion 23 (nostril searching area setting means), a nostril detecting portion 24 (nostril detecting means), an eye searching area setting portion 25 (eye searching area setting means), a lower eyelid detecting portion 26 (lower eyelid detecting means), an upper eyelid detecting portion 27 (upper eyelid detecting means), an eye opening level determining portion 28, a display processing portion 29, a data storing portion 5, the display device 7 and the like. The data storing portion 5 stores face image data 51, face area and chin position data 52, nostril searching area data 53, nostril data 54, eye searching area data 55, and eyelid data 56. The eye detecting device 1 detects two pairs of the upper and the lower eyelids of the eyes in the face image. In addition, the lower eyelid detecting means 26 and the upper eyelid detecting means 27 serve as an eye searching portion (eye searching means).

Figure 3:
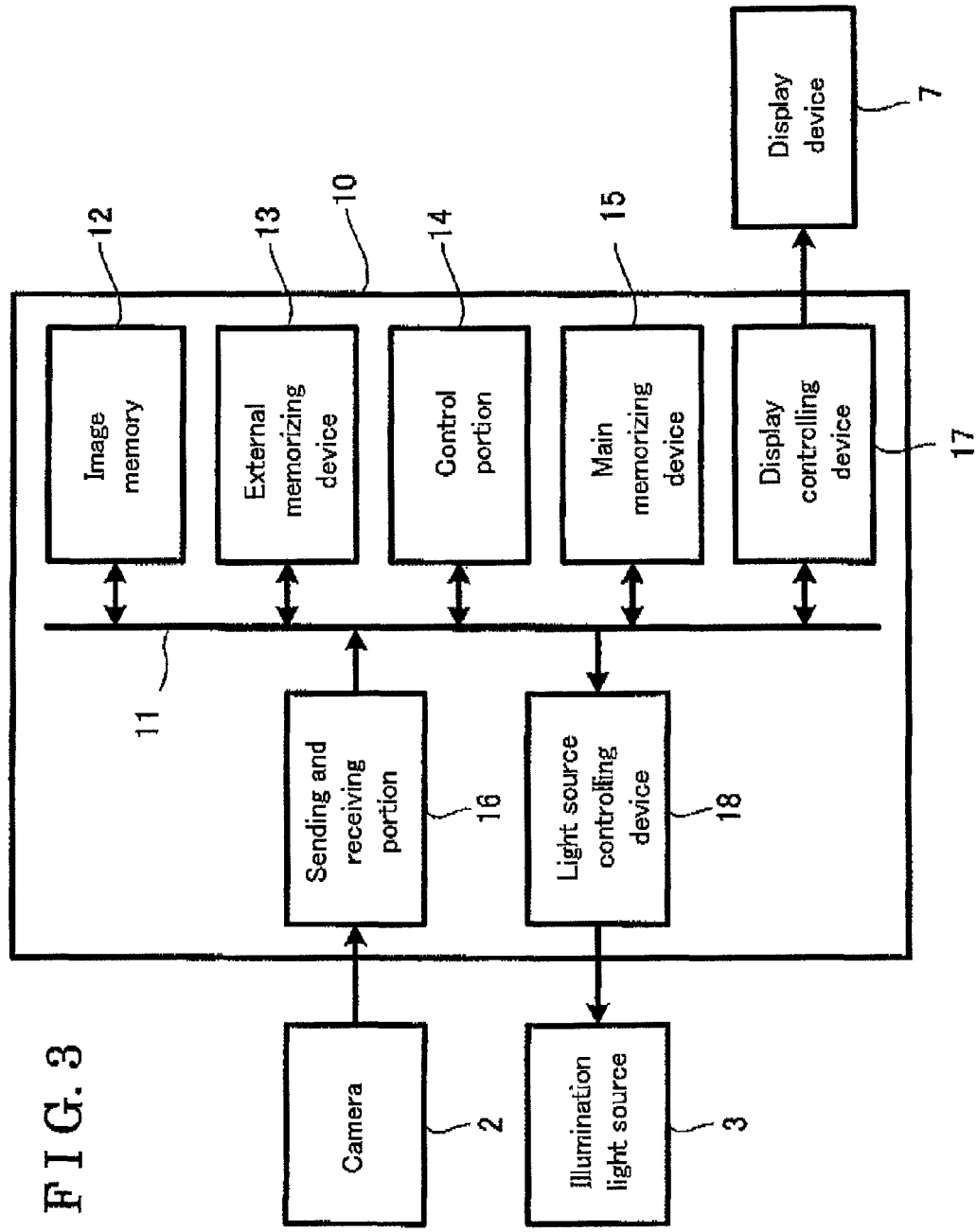
FIG. 3 is a block diagram illustrating a configuration of a computer illustrated in FIG. 1.

FIG. 3 is a block diagram illustrating an example of a configuration of the eye detecting device 1. The computer 10 includes a sending and receiving portion 16, an image memory 12, an external memorizing portion 13, a control portion 14, a main memorizing portion 15, a display controlling device 17, and a light source controlling device 18. Each of the image memory 12, the external memorizing portion 13, the main memorizing portion 15, the sending and receiving portion 16, the display controlling device 17 and the light source controlling device 18 is connected to the control portion 14 via an internal bus 11.

The control portion 14 is configured with a Central Processing Unit (hereinafter referred to as a CPU) and the like. The control portion 14 follows a program memorized in the external memorizing portion 13 in order to execute processes of the image input portion 21, the chin detecting portion 22, the nostril searching area setting portion 23, the nostril detecting portion 24, the eye searching area setting portion 25, the lower eyelid detecting portion 26, the upper eyelid detecting portion 27, the eye opening level determining portion 28 and the display processing portion 29. The process of each of the image input portion 21, the chin detecting portion 22, the nostril searching area setting portion 23, the nostril detecting portion 24, the eye searching area setting portion 25, the lower eyelid detecting portion 26, the upper eyelid detecting portion 27, the eye opening level determining portion 28 and the display processing portion 29 is executed by the control portion 14 and the programs executed by the control portion 14.

The main memorizing portion 15 is configured with a Random-Access Memory (RAM) and the like. Further, the main memorizing portion 15 is utilized as a working area of the control portion 14. A part of the image memory 12 and a part of the main memorizing portion 15 are assigned to the data storing portion 15 as memory areas.

The external memorizing portion 13 is configured with nonvolatile memories, such as a flash memory, a hard disk, a Digital Versatile Disc (DVD), a Digital Versatile Disc Random-Access Memory (DVD-RAM), a Digital Versatile Disc ReWritable (DVD-RW) or the like. The external memorizing portion 13 preliminarily memorizes a program for executing the above-mentioned processes at the control portion 14. Further, the control portion 14 executes the program following the program data memorized in the external memorizing portion 14. Then, the external memorizing portion 13 memorizes a data sent from the control portion 14. For example, time-series image data may be stored at the external memorizing portion 13.

When a network is utilized to for the eye detecting device 1, the sending and receiving portion 16 is configured with, for example, either one of a Modulator-demodulator or a network terminator and either one of a serial interface or a Local Area Network interface (LAN interface) that is connected to the either one of the Modulator-demodulator or the network terminator. On the other hand, when the camera 2 is directly connected to the computer 10, the sending and receiving portion 16 is configured with, for example, a National Television Standard Committee interface (NTSC interface). The control portion 14 inputs the image data from the camera 2 via the sending and receiving portion 16. The image memory 12 memorizes the image data that is generated by means of the camera 2 and that is inputted to the image memory 12 via the sending and receiving portion 16.

The display controlling device 17 controls the display device 7 under the control of the control portion 14. The light source controlling device 18 controls the illumination light source 3 to be turned on or turned off.

The control portion 14 executes the program stored in the external memorizing portion 13 in order to detect the upper and lower eyelids pairs. Specifically, the control portion 14 detects the upper and lower eyelids pairs by executing the programs stored in the external memorizing portion 13 in a manner where, firstly the control portion 14 processes the image data generated by the camera 2, secondly the control portion 14 detects the right and the left ends and the upper and the lower portions of the face, thirdly the control portion 14 detects possible the upper and the lower eyelids within the eye searching area on the basis of the detected right and left ends and the detected upper and lower portions of the face, and then finally, the control portion 14 selects the best as the upper and the lower eyelids pairs from within a possible upper and lower eyelids pair that suit to a condition of the upper and the lower eyelids.

Returning to FIG. 2, an operation of each portion of the eye detecting device 1 will be described below. The camera 2 captures the image of the face. The image input portion 21 inputs the time-series image data from the camera 2 at every predetermined time interval, and then the image input portion 21 outputs the inputted time-series image to the data storing portion 5. Then the data storing portion 5 memorizes the time-series image as the face image data 51.

The chin detecting portion 22 abstracts the face area from the face image data 51, and then the chin detecting portion 22 detects the in within the face area. In order to abstract the face area, for example, edges forming an outline of the face are abstracted from the face image. Alternatively, the outline of the face may be abstracted by a pattern matching. The face area is set by detecting edges located above the eyebrows and an edge located below the chin within the face outline. The chin detecting portion 22 outputs data of the detected position of the chin and the face area to the data storing portion 5. Then the storing portion 5 memorizes the detected position of the chin and the face area as the face area and the chin position data 52.

FIGS. 4A, 4B, 4C and 4D are diagrams for describing an example of fixed data that is used for abstracting an edge. The external memorizing portion 13 stores an operator of the sobel filter for detecting horizontally changing edges and an operator for detecting vertically changing edges. In this embodiment, a concatenation of dots whose luminance change from bright to dark, or from dark to bright in a horizontal direction are called horizontally changing edges. The dots of the horizontal edges generally continue in a vertical direction, hence, the horizontal edges ane also called vertical edges. On the other hand, the vertically changing edges indicate concatenation of dots whose luminance change from bight to dark, or from dark to bright in a vertical direction. The dots of the vertically changing edges generally continue in a lateral direction, hence, the vertically changing edges are also called as lateral edges.

Figure 4C:
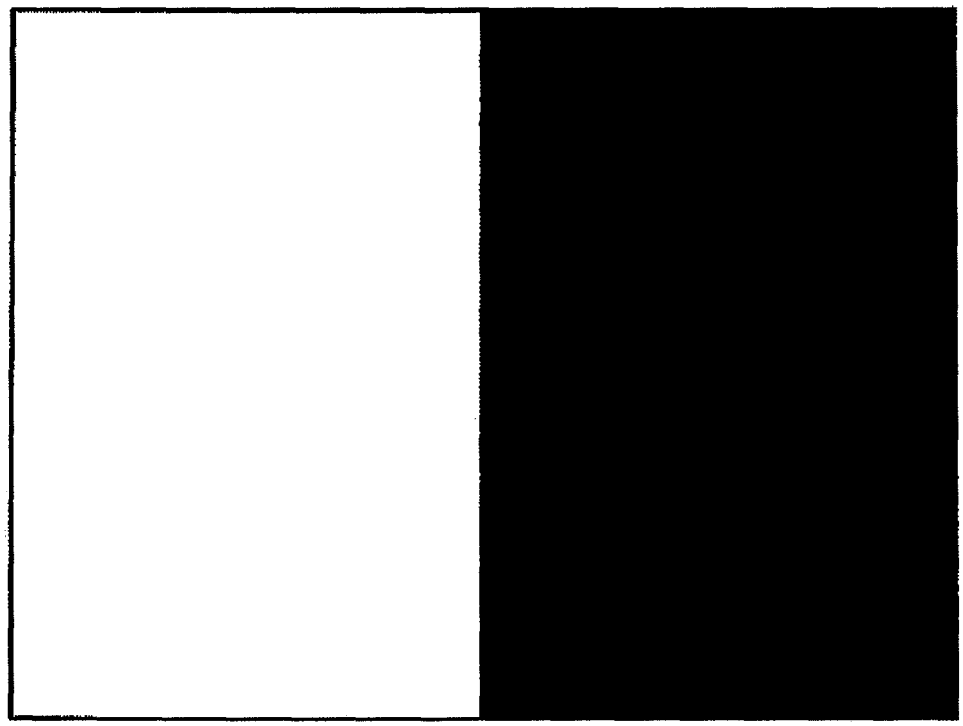
FIG. 4C is a diagram illustrating an example of successive difference of intensity in a vertical direction.
Figure 4D:
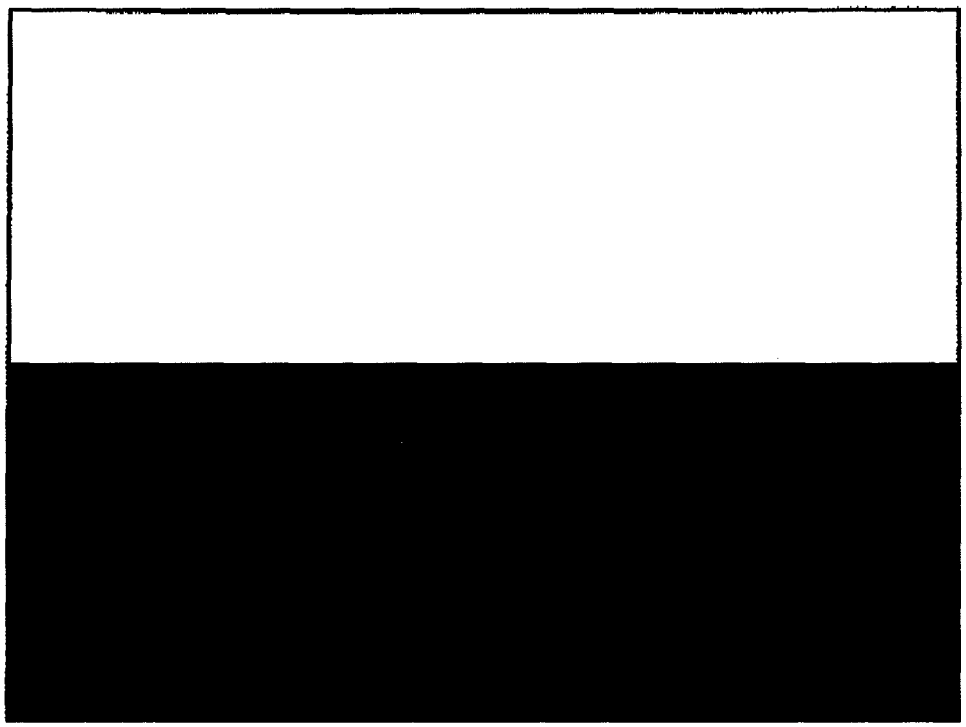
FIG. 4D is a diagram illustrating an example of successive difference of intensity in a lateral direction.

The sobel filter for detecting the horizontally changing edges (the vertical edges) illustrated in FIG. 4A is the operator for abstracting a boundary (edge) between dark color and bright color that continue in the vertical direction as illustrated in FIG. 4C. The sobel filter for detecting the vertically changing edges (the lateral edges) illustrated in FIG. 4B is the operator for abstracting a boundary (edge) between the dark color and the bright color that continue in the lateral direction as illustrated in FIG. 4D.

Figure 5:
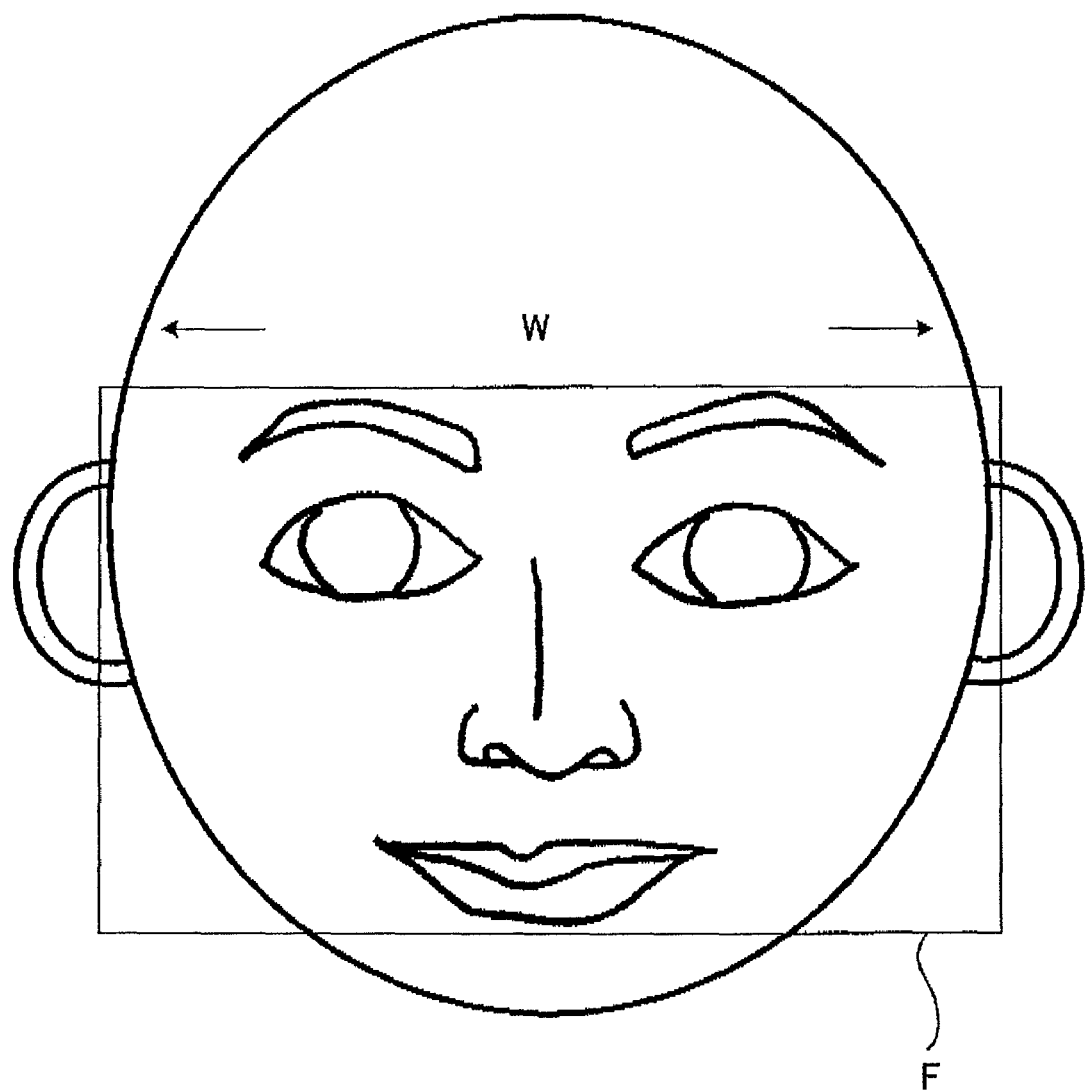
FIG. 5 is a diagram illustrating and example of data used for determining an area of a face image.

As illustrated in FIG. 5, for example, a face area F is set to have a range whose horizontal width corresponds to the maximum width of the face and whose vertical length corresponds to a distance between the edges above the eyebrows and the edge of the chin.

The nostril searching area setting portion 23 sets the nostril searching area within which the nostril detecting portion 24 searches the nostrils on the basis of the face area and chin position data 52. Specifically, the nostril searching area setting portion 23 sets the nostril searching area within the face area F based on proportion calculated on the bases of the position of chin and a statistical data. Further specifically, the nostril searching area setting portion 23 sets the nostril searching area on a center portion of the face. Additionally, the nostril searching area may be set at a position a predetermined distance above the detected position of the chin an upward direction. For example, when the face area F is set on the face image, the nostril searching area setting portion 23 sets a minimum range as the nostril searching area N. The minimum range is a range within which the nostrils are always detected according to statistical examination preliminarily conducted. Then, the nostril searching area setting portion 23 outputs data of the nostril searching area N to the data storing portion 5. Then, the data storing 5 memorizes the nostril searching area N as the nostril searching area data 53.

Figure 6:
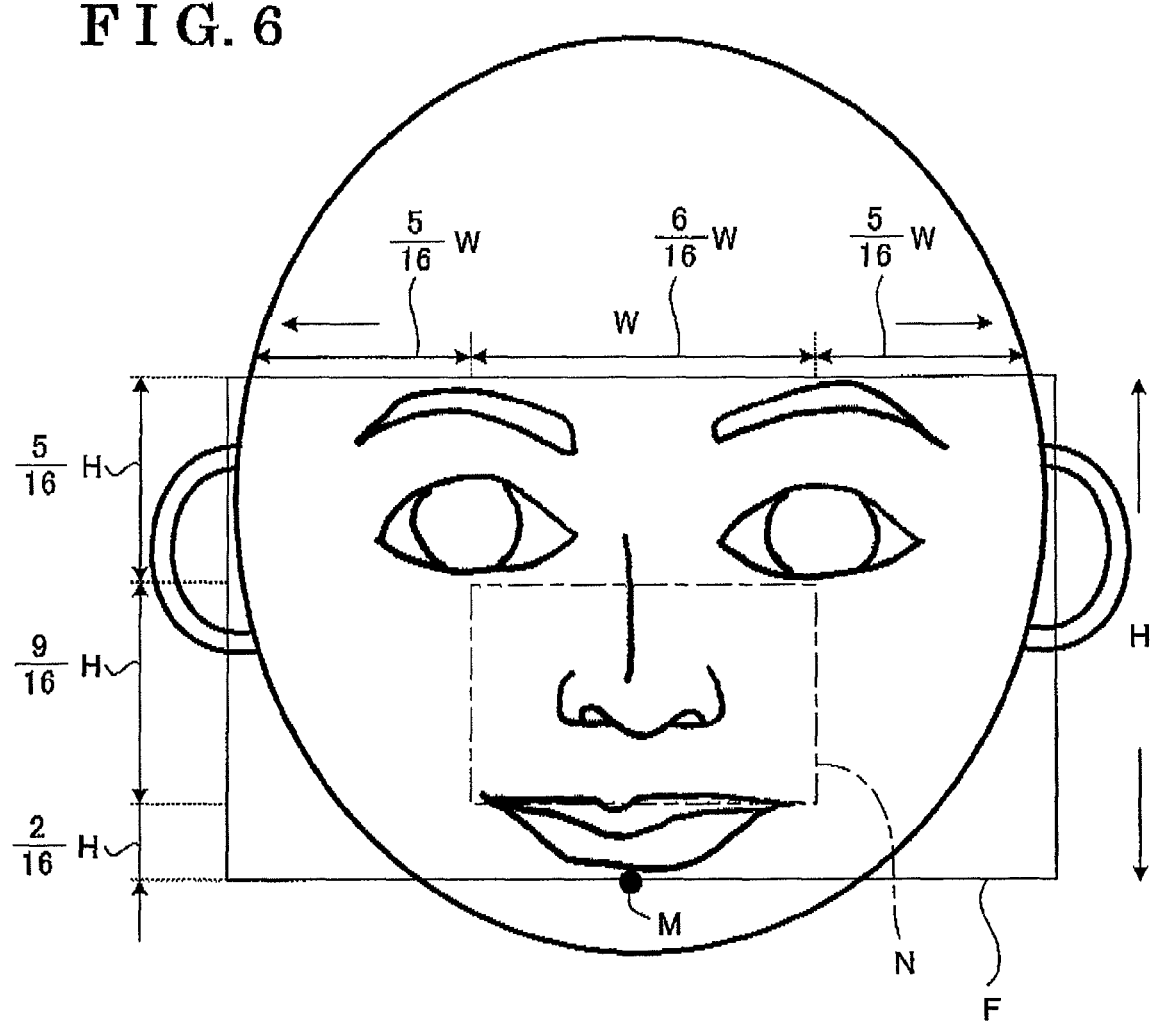
FIG. 6 is a diagram illustrating an example of a nostril searching area.

FIG. 6 illustrates an example of the nostril searching area N that is illustrated with a chain line. For example, in a case where a height of the face area F is referred to as H, and a width of the face area F is referred to as W, the nostril searching area N is set to have a range of $9/16$ H and $6/16$ W, and further the nostril searching area N is set at a position $2/16$ H above the chin position M in the vertical direction of the face image and on the middle of the face area F in the lateral direction.

The nostril detecting portion 24 searches dark colored two neighboring substantially round shapes within the nostril searching area N in order to detects the nostrils (determining means). For example, the nostril searching portion 24 detects the horizontally changing edges and the vertically changing edges within the nostril searching area N. The dots whose luminance change from bright to dark in a direction from left to right are referred to as vertical minus edges, and the dots whose luminance change from dark to bright in a direction from left to right are referred to as vertical plus edges. Further, the dots whose luminance change from the bright to dark in a direction from top to bottom are referred to as lateral minus edges, and the dots whose luminance change from dark to bright in the direction from top to bottom are referred to as lateral plus edges. One of the nostrils appears on the face image so as to have the vertical minus edge on the left, the vertical plus edge on the right, the lateral minus edge on upper portion and the lateral plus edge on the lower portion of the dark colored substantially round shape.

The one of the nostrils, each of which is surrounded by the four different edges, appears to be darkened towards a centre thereof. When one end of each of the vertical minus edge, the vertical plus edge, the lateral minus edge and the lateral plus edge overlaps with each other in this order, the protruding shape is considered as one of a possible pair of nostrils. When the nostril detecting portion 24 detects neighboring two of those edges lining in a lateral direction, the nostril detecting portion 24 determines the neighboring two of those edges as the possible pair of nostrils.

There may be a case where more than two possible pairs of the nostrils are detected within the nostril searching area N. For example, when the driver wears the glasses, the nose pads contacting the nose of the driver's face may be detected as the possible pair of nostrils. When a plurality of the possible pairs of nostrils are detected, the nostril detecting portion 24 determines a possible pair of nostrils positioned closest to the chin position M as the pair of nostrils. Then the nostril detecting portion 24 outputs data of the detected nostrils to the data storing portion 5. Then, the data storing portion 5 memorizes the detected nostrils as the nostril data 54.

The pair of the nostrils is accurately detected by setting the nostril detecting area N, and then by searching the nostrils within the nostril detecting area N. Further, even if a plurality of the possible pairs of nostrils are detected, the nostril detecting portion 24 accurately detects the pair of the nostrils by determining the possible pair of nostrils positioned closest to the chin position M as the pair of the nostrils within the nostril detecting area N.

The eye searching area setting portion 25 sets an eye detecting area within the face area F on the basis of the position of the determined pair of nostrils. In a case where the face area F is set on the face image, the eye searching area setting portion 25 sets a minimum area as the eye searching area. The minimum area is an area in which the eye is always detected according to a statistical examination conducted preliminarily. For example, the eye detecting area is set by placing two rectangles above the pair of the nostrils so as to be spaced away from the determined position of the nostrils for a predetermined distance. Sides of each of the rectangles is set, for example, by multiplying a vertical length or a lateral width of the face area F by a predetermined proportion. The eye searching area setting portion 25 outputs data related to the set eye searching area to the data storing portion 5. Then, the data storing portion 5 memorizes the set eye searching area as the eye searching area data 55.

Figure 7:
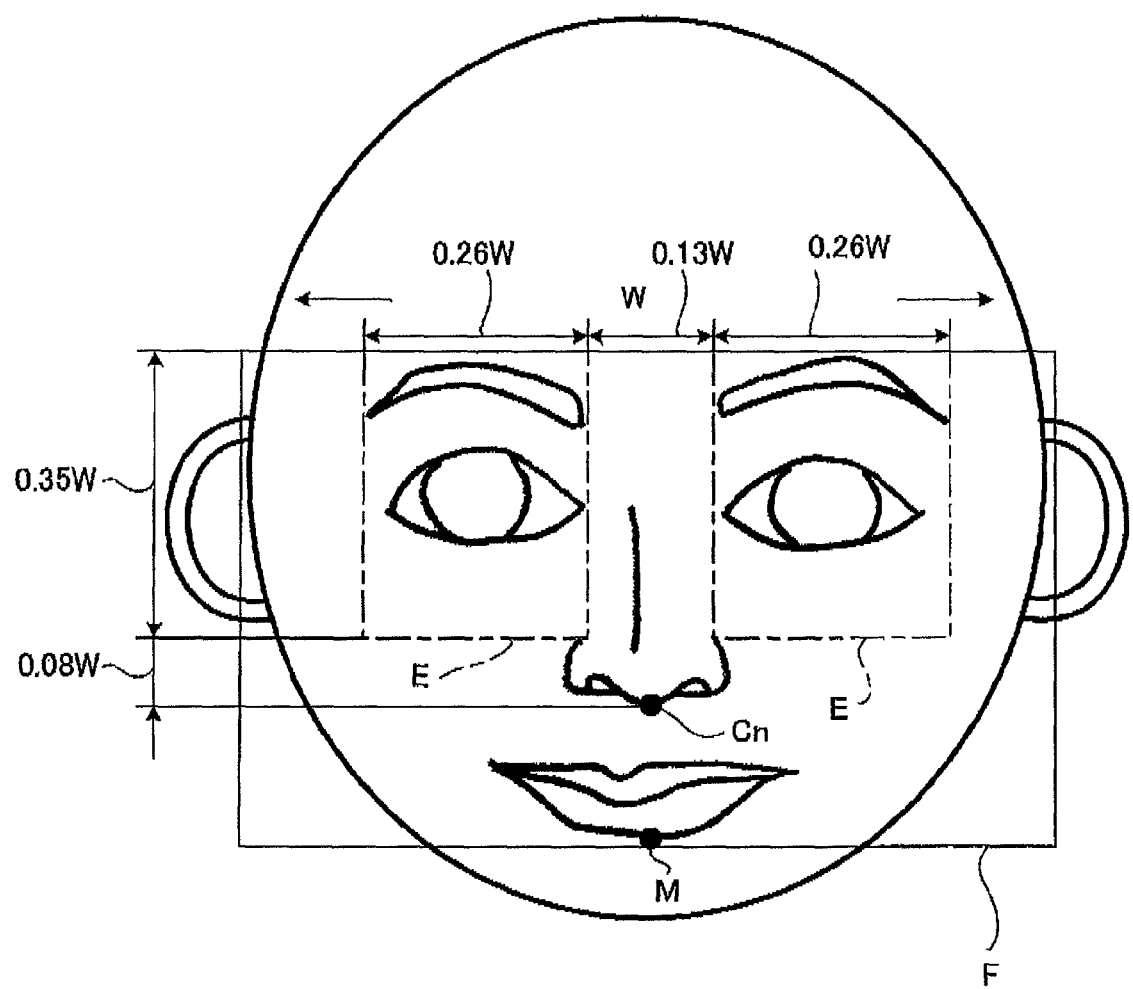
FIG. 7 is a diagram illustrating and example of eye searching area.

As mentioned above, in this embodiment, the eye searching area E is separated into two eye searching areas that are referred to as eye searching areas E. FIG. 7 illustrates an example of the eye searching areas E. The two rectangles illustrated with chain lines in FIG. 7 indicate the eye searching areas E. For example, in a case where the width of the face area F is referred to as W, one of the eye searching areas E is set to have a vertical height of 0.35 W and a lateral width of 0.26 W. Then, the two rectangles are positioned 0.08 W above a center point Cn between the two nostrils (hereinafter referred to as a center portion of a nostrils Cn) in the face image, and right and left rectangles are spaced away from each other by 0.13 W so as to be symmetrical relative to the center point of the nostrils Cn. The eye searching area setting portion 25 sets the two rectangles that are positioned within the face area F in the above-mentioned manner as the eye searching areas E.

The upper and the lower eyelids are detected by scanning the eye searching areas E in the vertical direction thereof. For example, when the eye searching areas E are scanned from its bottom, the lower eyelids are detected firstly, and then the upper eyelids are detected on the basis of a position of the detected lower eyelids. On the other hand, when the eye searching areas E are scanned from its top, the upper eyelids are detected firstly, and then the lower eyelids are detected on the basis of a position of the detected upper eyelids. In this embodiment, the case where the eye searching areas E are scanned from the bottom thereof will be described below as an example of detecting the upper and the lower eyelids.

The lower eyelid detecting portion 26 detects the lower eyelids within the eye searching areas E. The lower eyelid detecting process is described below with one of the eyelids within the eye searching area BE as an example. For example, the lower eyelid detecting portion 26 detects the lateral edge by scanning one of the eye searching area E from the bottom portion thereof by using the sobel filter for detecting the vertically changing edges illustrated in FIG. 4B. In many cases, when the eye searching area E is scanned from its bottom, a first detected lateral plus edge having a length equal to or more than a predetermined length is determined as the lower eyelid.

When the driver wears glasses, a frame of the glasses may be detected. However, when the driver wears the glasses, the nose pads of the glasses are detected by the nostril detecting portion 24. Hence, the frame of the glasses is easily distinguished from the lower eyelids of the driver. Further, the edges indicating the frame of the glasses is thinner than the edges indicating the eyes or the eyebrows, and the edges indicating the frame of the glasses appear substantially horizontally, hence, the frame of the glasses is easily distinguished from the eyes or the eyebrows of the driver's face. The lower eyelid detecting portion 26 outputs data related to the detected lower eyelids to the data storing portion 5. Then the data storing portion 5 memorizes the detected lower eyelids as a part of the eyelid data 56.

The upper eyelid detecting portion 27 detects upper eyelids within the eye searching areas E, more specifically, within an area above the lower eyelids. The process of detecting the upper eyelids is described below with one of the upper eyelids within the eye searching area E as an example. For example, the lower eyelid detecting portion 27 detects the lateral edges by scanning the area above the lower eyelid from the bottom thereof by using the sobel filter for detecting the vertically changing edges illustrated in FIG. 4B. In many cases, when the area above the lower eyelid within the eye searching area E is scanned from the bottom to the top of the area above the lower eyelid, a first detected lateral minus edge having equal to or more than a predetermined length is determined as the upper eyelid. The lateral minus edge is an edge whose luminance changes from bright to dark in the direction from top to bottom.

In this embodiment, the case where the eye searching areas E are scanned from the bottom thereof is described above as an example of detecting the upper and the lower eyelids. However, the eye searching areas E may be scanned from the top thereof in order to detect the upper and the lower eyelids. For example, when one of the eye searching areas E is scanned from the top thereof, the upper eyelid detecting portion 27 searches a vertically changing edge whose luminance changed from bright to dark in the direction from top to bottom (lateral minus edge) in order to detect a first vertically changing edge fulfilling a predetermined condition. Then, the upper eyelid detecting portion 27 determines the first detected vertically changing edge as the upper eyelid. In the case where one of the eye searching area E is scanned from the top thereof the lower eyelid detecting portion 26 searches an area below the detected upper eyelid in order to detect the lower eyelid.

Before the upper eyelids detecting portion 27 starts detecting the upper eyelids, the lower eyelids are detected by scanning the eye searching areas E from the bottom thereof, therefore, the lower eyelids are determined. The eye searching areas E are set on the basis of the position of the determined pair of the nostrils. Taking one of the eye searching areas E as an example, in a case where the lower eyelid is determined, when the area above the lower eyelid is scanned, the first lateral minus edge detected by the upper eyelid detecting portion 27 indicates the upper eyelid, except for a possibility of an upper edge of iris of the eye. Hence, by setting the upper eyelid detecting portion 27 not to detect edges having length shorter than a predetermined length, the upper eyelid detecting portion 27 accurately determines the first detected lateral minus edge as the upper eyelid when the area above the lower eyelid is scanned. The upper eyelid detecting portion 27 outputs data related to the detected right and left eyelids to the data storing portion 5. Then the data storing portion 5 memorizes the detected right and left eyelids as a part of the eyelids data 56.

The eye opening level determining portion 28 calculates level of opening of the eyes on the basis of the pairs of the upper and the lower eyelids. The level how wide the eyes are opened (eye opening level) is detected on the basis of, for example, a distance between a center of the upper eyelids and a center of the lower eyelids.

The process of calculating and determining eye opening level is described below with one of the upper and lower eyelids pairs (one of the driver's eyes) as an example. The eye opening level-determining portion 28 relates the pair of the upper and the lower eyelids to the opening level of the eye in chronologic order, and when the eye opening level determining portion 28 determines changes of the eye opening level corresponding to blinks, the eye opening level determining portion 28 does not determine that the driver closes his/her eyes. For example, when the opening level of a possible pair of eyelids whose opening level is equal to or more than the predetermined level becomes smaller and then becomes larger within a predetermined number of frames of the image, the eye opening level determines portion 28 determined that the driver blinks his/her eyes.

Further, for example, when the opening level of the eyelids is less than the predetermined level in successive images having equal to or larger than a number of the predetermined frames, the eye opening level determining portion 28 determines that the driver closes his/her eyes. For example, when the eye opening level determining portion 28 determines that the driver closes his/her eyes, the eye opening level determining portion 28 may determine that the driver is drowsing.

The display processing portion 29 displays the detected results of the upper and the lower eyelids together with the outline of the face and the like on the display device 7. Further, when the eye opening level determining portion 28 determines that the drive is drowsing, the opening level of the driver's eyes and an alarm display including sound may be provided.

Operation of the eye detecting device 1 will be explained below. The eye detecting device 1 is operated by the control portion 14 being in cooperation with the camera 2, the sending and receiving portion 16, the image memory 12, the external memorizing portion 13 and the main memorizing portion 15.

Figure 8:
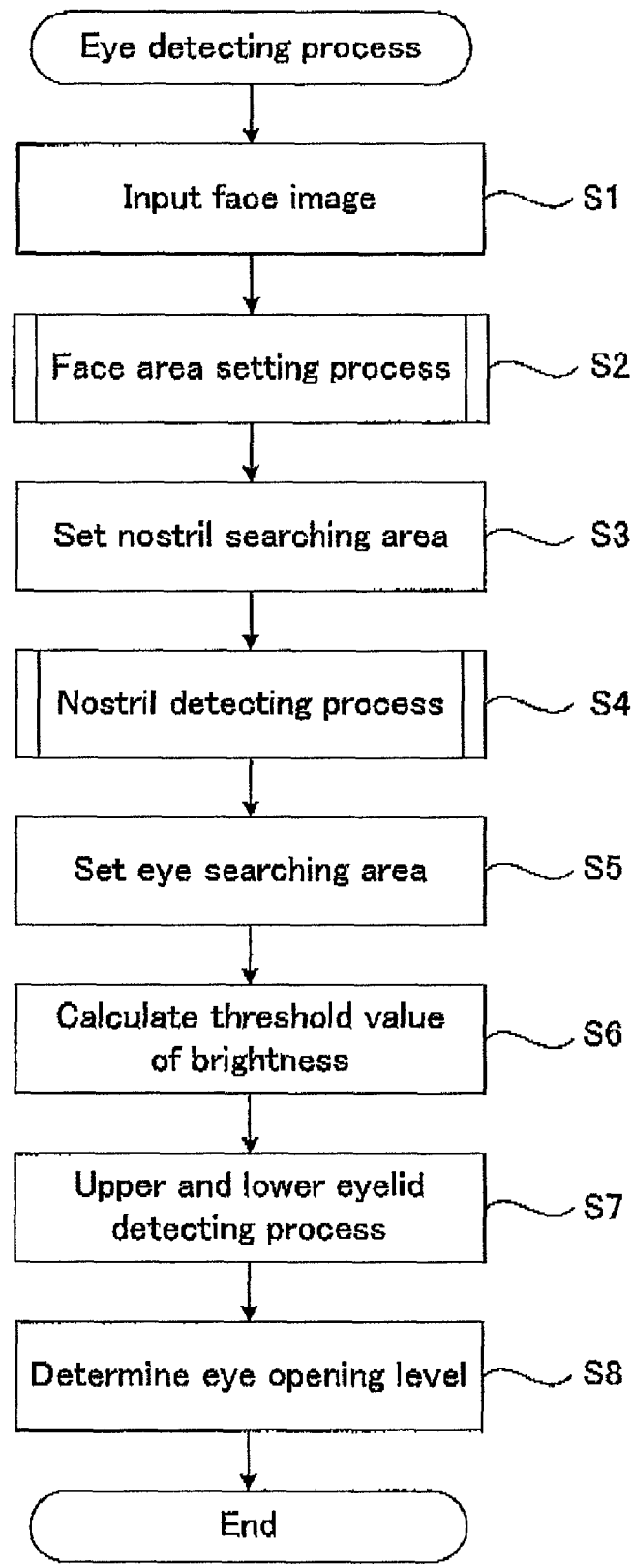
FIG. 8 is a flowchart illustrating an example of an operation of the eye detecting device.

FIG. 8 is a flowchart illustrating an example of the operation of the eye detecting device 1. In step S1, the control portion 14 inputs the face image in the time-series from the camera 2 via the sending and receiving portion 16. Then, as mentioned above, the chin detecting portion 22 sets the face area F (step S2).

Figure 9:
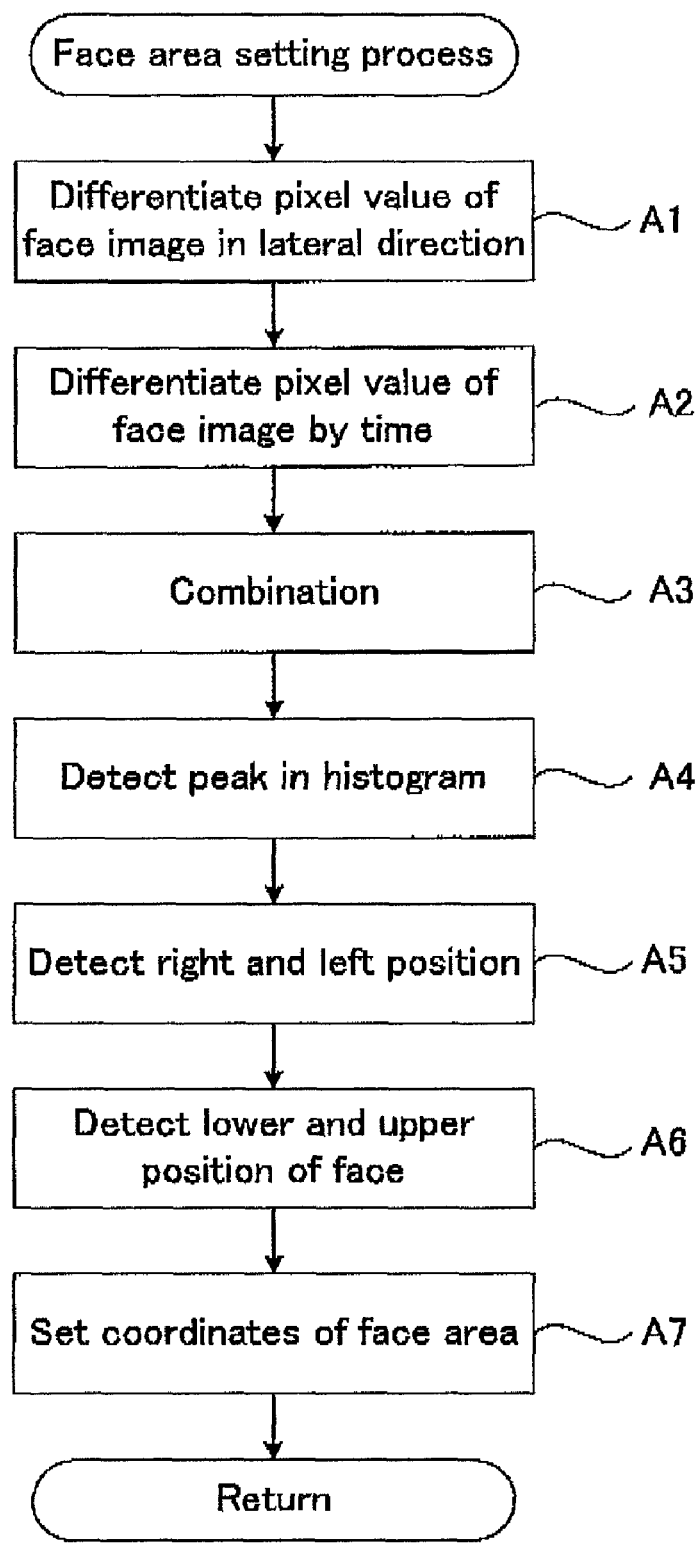
FIG. 9 is a flowchart illustrating an example of an operation of a face area setting process.

FIG. 9 is a flowchart illustrating an example of the operation of a face area setting process executed at S2. The control portion 14 reads the face image data 51 from the data storing portion 5, and then the control portion 14 differentiates pixel value of the face image in a lateral direction (step A1). Specifically, difference between luminance of each of the picture elements and luminance of each of abutting picture elements are calculated, and based on such difference, an edge portion abstracted image is generated. In the edge portion abstracted image, the vertical edges of the background behind the driver and the vertical edges of the face image are abstracted. Those vertical edges are abstracted even when the driver does not move his/her face.

Additionally, in a histogram obtained by projecting the pixel value (derivative of the luminance) of the edge portion abstracted image in a vertical direction, the right and the left ends of the face are not determined because intensities of all abstracted edges on the edge portion abstracted image are substantially the same.

The control portion 14 differentiates the pixel value of the face image by time in step A2. Specifically, by calculating difference between luminance of each picture element at certain time and luminance of each picture element at an immediately preceding time before the certain time, a pixel value time-differentiated image, in which only a moving object is emphasized, is generated.

Generally, because the driver does not remain still in the pixel value time-differentiated image, outlines of moving objects, in other words, the outline of the driver's face is detected so as to be thick. On the other hand, background objects, such as a window, a pillar and a head rest, remain stationary, hence, these objects are not detected in the pixel value time-differentiated image. In case where the driver moves frequently, the outline of the face is detected. However, in a case where the driver remains still, the outline of the driver's face is hardly detected in the picture elements time differentiated image. Hence, in order to detect the face outline of the driver even when the driver remains still, following processes need to be executed.

The control portion 14 generates a first composite image by combining the edge portion abstracted image and the pixel value time differentiated image in step A3. Then, the control portion 14 generates the histogram by projecting the picture value (luminance) of the first composite image in a vertical direction. Thus, in any cases where the driver remains still or not, the vertical edges of the driver are shown in the first composite image.

Alternatively, the histogram may be generated by projecting each of the pixel value of the edge portion abstracted image and the pixel value of the pixel value time differentiated image in a vertical direction, and these two histograms can be combined in order to abstract the face outline in any cases where the driver remains still or not. Then, plural peaks are detected in the histogram of the first composite image 1 (step A4).

The control portion 14 selects two peaks, which show a best match to the width of the drivers face, from the plural peaks detected on the histogram of the first composite image, and then the control portion 14 determines one of the two peaks as the left end of the face and the other two peaks as the right end of the face (step A5).

Additionally, a right and left ends of face detecting routine is not limited on the above-mentioned example. The right and left ends of face detecting routine may be modified as follows.

For example, the face image is used when the control portion 14 executes time derivative calculation to the pixel value, however, the edge portion abstracted image may be used instead of the face image. In other words, the pixel value (luminance) of the edge portion abstracted image is differentiated by time in order to generate the edge portions time differentiated image. Thus, the vertical edges of the stationary objects in the background, such as the window and the head rest, are not shown in the edge portion abstracted image, as a result, only vertical edges of the moving object with the face image may be abstracted.

The control portion 14 executes similar processes as above in steps following the step A3. In the steps A3 and A4, the control portion 14, similarly to the above-mentioned processes, combines the edge portion abstracted image and the edge portions time differentiated image in order to generate a second composite image, and then the control portion 14 generates the histogram by projecting pixel value (luminance) of the second composite image in a vertical direction. Based on this histogram, the right and the left ends of the driver's face may be detected by detecting peaks on the histogram.

Further, the control portion 14 generates a histogram by projecting the lateral edges within a face width range in a horizontal direction. In this histogram, peaks exist at portions corresponding to eyebrows, eyes, and mouth. Hence, the control portion 14 detects the upper and the lower portion of the face based on the peaks in the histogram (step A6). Additionally, edges of upper eyebrows may be detected by scanning the vertical edges from a top to a bottom within the face width range, and the edges of the chin may be detected by scanning the vertically changing edges from the bottom to the top within the face width range.

In step A7, the control portion 14 sets the coordinates of the face area F, whose width corresponds to the width of the face between the left and the right ends of the face and whose height corresponds to a distance between the upper eyebrows and the chin position M, then the control device 14 returns to the eye detecting process illustrated in FIG. 8. Additionally, the detection method for detecting the right and the left ends of the face and the upper and the lower portions of the face is not limited on the above-mentioned example. A template matching or a range image may be used to detect the right and the left ends and upper and lower portions of the face.

Returning to the flowchart illustrated in FIG. 8, the nostril searching area setting portion 23 sets the nostril searching area N within the face area F in step S3. As mentioned above, the nostril searching area setting portion 23 sets the nostril searching area N within the face area F on the basis of, for example, the proportion that is calculated based on the chin position M and the statistical data.

Figure 10:
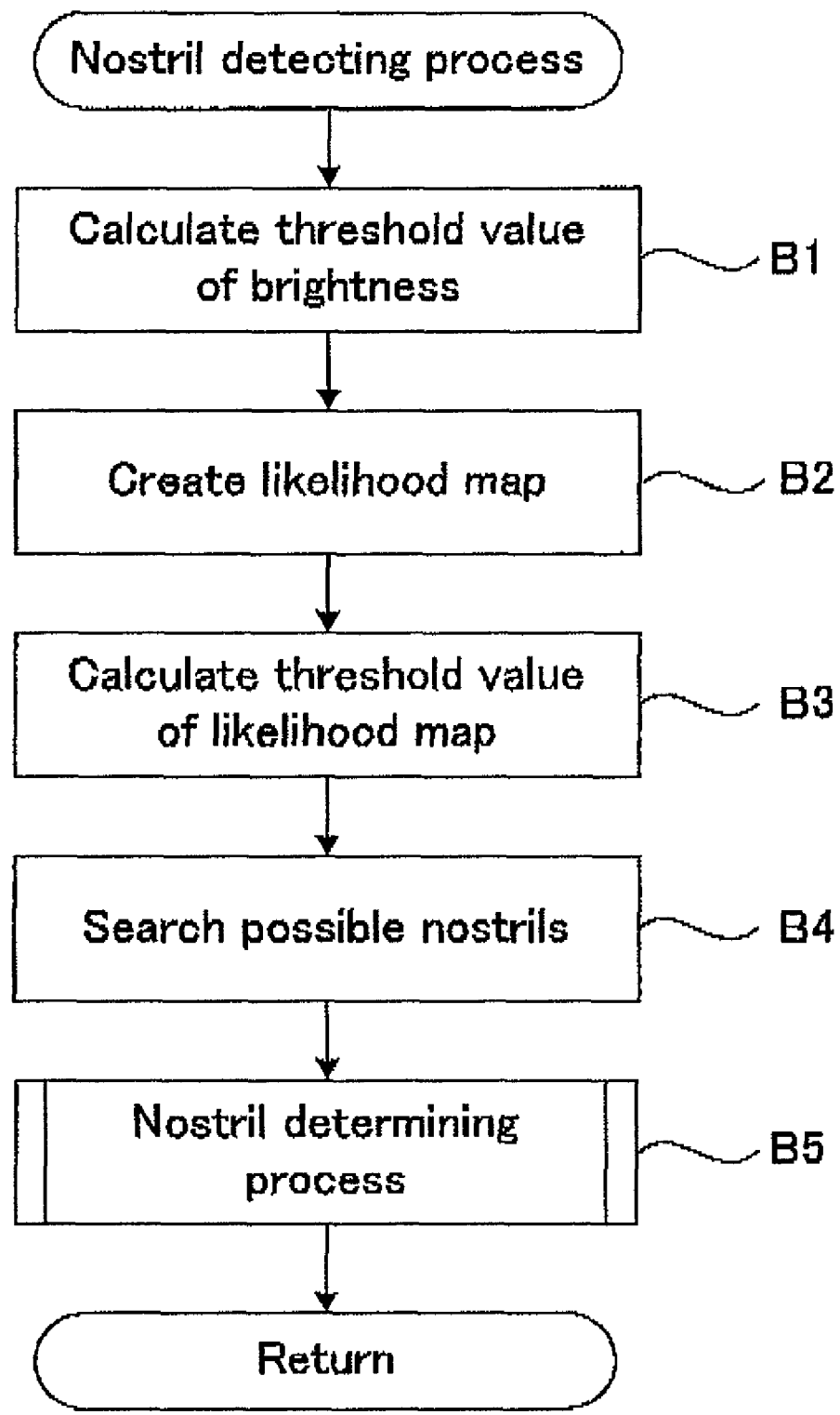
FIG. 10 is a flowchart illustrating an example of an operation of a nostril detecting process.

The control portion 14 detects the pair of the nostrils within the set nostril searching area N in step S4 (nostril detecting step). FIG. 10 is a flowchart illustrating an example of the operation of the nostril detecting process executed in the step S4.

The control portion 14 calculates an average luminance of the picture elements within the face area F, and then the control portion 14 calculate a threshold value of brightness for distinguishing a bright portion from a dark portion on the basis of the average luminance (step B1). Further, the control portion 14 searches the picture elements whose luminance is lower (darker) than the threshold value of brightness. Then, in a step B2, the control portion 14 detects a likelihood of a round shape formed by successive groups of picture elements in low luminance, and the control portion 14 generates a likelihood map in the nostril searching area N.

The likelihood of the round shape formed by the group of the picture elements in low luminance may be calculated on the basis of, for example, a distance between a center point of each of the edges and a barycentre of the group of the picture elements in low luminance. The center point indicates a center point of each of successive edges. Alternatively, by applying a fact that when the group of the picture elements form a near circular shape, an area formed by the picture elements becomes larger and the likelihood of the round shape may be determined on the basis of a number of picture elements existing within the group of the picture elements in low luminance relative to a number of picture elements forming a boundary of the group of the picture elements in low luminance.

The control portion 14 calculates a threshold value of the likelihood on the basis of a maximum likelihood on the likelihood map in step B3. Then, the control portion 14 determines possible nostrils formed by the groups of the picture elements in low luminance exceeding the threshold value of the likelihood in step B4. When the control portion 14 detects possible nostrils, the control portion 14 pairs the possible nostrils that exist close to each other.

Figure 11:
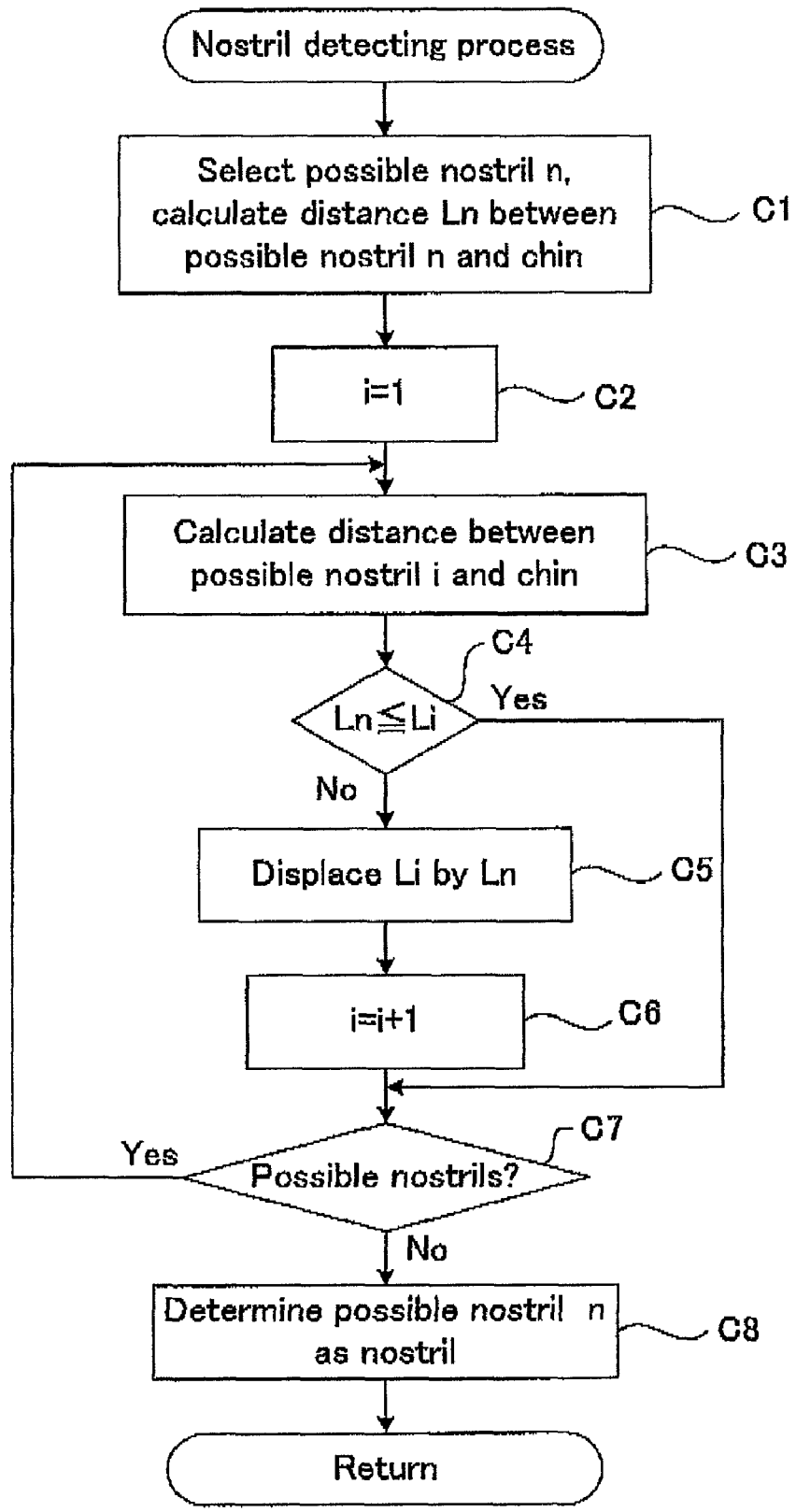
FIG. 11 is a flowchart illustrating and example of an operation of a nostril determining process.

The control portion 14 determines a possible pair of nostrils having the highest likelihood as the pair of the nostrils in step B5. Among the possible pairs of the nostrils, a possible pair of nostrils located the closest to the chin position M may be determined as the pair of the nostrils. FIG. 11 is a flowchart illustrating an example of the operation of the nostril determining process.

The control portion 14 selects one of the possible pairs of nostrils, and then the control portion 14 determines the selected possible pair of nostrils as the possible pair of nostrils n. Then, the control portion 14 calculates a distance Ln between the chin position M and a center point between the possible pair of nostrils n in step C1. In step C2, the control portion 14 sets the rest of the possible pair of nostrils to "i=1", and then the control portion 14 selects the possible pair of nostrils i.

The control portion 14 calculates the distance Li between the chin position M and a center point between the possible pair of nostrils i in step C3. Then, the control portion 14 compares the distance Ln with the distance Li, and when the distance Ln is equal to or longer than the distance Li (No in step C4), the control portion 14 substitutes the distance Li for the distance Ln, and then the control portion 14 replaces the number i of the possible pair of nostrils i with the possible pair of nostrils n in step C5. When the distance Ln is equal to or shorter than the distance Li (Yes in a step C7), the control portion 14 does not replace the selected possible pair of nostrils n.

The control portion 14 increases the number i in step C6, and when the possible pair of nostrils i exists (Yes in the step C7), the control portion 14 returns to the step C3 and repeats the comparison of the distances Ln and Li (steps C3, C4, C5, and C6). When there is no other possible pair of nostrils i (No in the step C7), the control portion 14 eventually determines the selected possible pair of nostrils n as the pair of the nostrils in step C8. Then, the control portion 14 returns to the nostril detecting process.

Returning further back to the eye detecting process illustrated in FIG. 8 from the nostril detecting process, the control portion 14 (the eye searching area setting portion 25) sets the eye searching areas E on the basis of the position of the pair of the nostrils in step S5 (eye searching area setting step). As mentioned above, for example, each of the eye searching areas E is set by multiplying length of either one of the vertical height or the horizontal width of the face area F by the predetermined proportion, and then, the eye searching area E is set to be arranged in the face image so as to be spaced away from the pair of the nostrils for a predetermined distance.

In step S6, the control portion 14 calculates the average luminance of the picture elements existing within the face area F, and then the control portion 14 calculates the threshold value of the brightness for distinguishing the bright portion from the dark portion in the ace image on the basis of the average luminance. The threshold value of the brightness calculated in the nostril detecting process (in the step B1 in FIG. 10) may be utilized, instead of the calculation of the threshold value of the brightness executed in the step S6. Then, the control portion 14 executes the upper and lower eyelids detecting process in step S7. The upper and the lower eyelids detecting process serves as an eye searching process (eye searching step).

The process of determining the upper and the lower eyelids is described below with one of the eye searching areas E as an example. The control portion 14 (the lower eyelid detecting portion 26) scans the eye searching area E from the bottom thereof in order to search the picture elements whose luminance are lower (darker) than the threshold value of the brightness within the eye searching area E. Then, the control portion 14 determines the vertically changing edge, whose luminance changes from bright to dark in the bottom-to-top direction and whose length is equal to or longer than the predetermined length, as the lower eyelid. Further, the control portion 14 (the upper eyelid detecting portion 27) searches the upper eyelid on the basis of position of the detected lower eyelid. The control portion 14 determines the vertically changing edge, whose luminance changes from dark to bright in the direction from top to bottom and whose length is equal to or longer then the predetermined length as the upper eyelid.

The control portion 14 (the eye opening level determining portion 28) determines the opening level of the driver's eyes on the basis of the detected upper and the lower eyelids in step S8. The control portion 14 may determine whether the driver opens his/her eyes or closes his/her eyes on the basis of, for example, the number of the picture elements existing within a range surrounded by the pair of edges indicating the upper and the lower eyelids.

As mentioned above, the control portion 14 (the nostril detecting portion 24) detects the pair of the nostrils from the face image data, and then the control portion 14 (the eye searching area setting portion 25) sets the eye searching areas E on the basis of the position of the detected nostrils. Then the control portion 14 (the lower eyelid detecting portion 26) scans the eye searching areas E from the bottom thereof in order to detect the lower eyelids, and further, the control portion 14 (the upper eyelid detecting portion 27) detects the upper eyelids in the areas located above the detected lower eyelids. Hence, according to the eye detecting device 1 of the embodiment, the driver's eyes are quickly and accurately detected in the face image.

Further, the control portion 14 (the nostril searching area setting portion 23) sets the nostril searching area N on the basis of features of the face area F, and then the control portion 14 (the nostril detecting portion 24) detects the pair of the nostrils within the nostril searching area N by referring to the features of the nostrils. Hence, the pair of the nostrils is quickly and accurately detected. As a result, because the eye searching areas E are set in an appropriate range, the upper and the lower eyelids are accurately detected.

The above-mentioned hardware configuration and the processes illustrated in the flowcharts describe only an example of tee configuration and operations of the eye detecting device 1, and any desired changes and modifications may be applied.

The control device 14, the sending and receiving portion 16, the image memory 12, the external memorizing portion 13, the main memorizing portion 15 and the like mainly execute the processes in the eye detecting device 1. Each of the parts mainly executing the processes may not be specialized for the processes, instead, a general used computing system may be employed. For example, a computing program for executing the above-mentioned operations stored in a readable storage media, such as a flexible disc, the CD-ROM, DVD-ROM and the like is installed in a computer, and such computer may be used for executing the above-mentioned processes in the same manner as the eye detecting device 1. Further, the computing program is uploaded to a memory device of a server device, which is connected to a communication network such as the internet and the like, then the computer that is able to access the communication network downloads and installs the computing program, and such computer may be used for executing the above-mentioned processes in the same manner as the eye detecting device 1.

The computer is run by an operating system (OS) and an application program. In a case where the processes are executed by the computer in the same manner as the eye detecting device 1 by the OS and the application program respectively, or by in cooperation with the OS and the application program, only the application program may be stored in the storage media or the memory device.

Additionally, the computing system may be delivered through the communication network by overlapping the computing program on a carrier wave. For example, the computing program may be uploaded to a bulletin board system (BBS) in the communication network so that the computing program is downloaded through the network to each computer. Then, the above-mentioned processes way be executed by executing the computing program, which is installed in the computer, together with other application program under the control of the OS.

According to the embodiment, the eye detecting device 1 includes the nostril searching area setting portion 23 for setting the area in the face image in which the nostril is supposed to exist as the nostril searching area N, wherein the nostril detecting portion 24 searches the nostril within the nostril searching area N under a predetermined condition the nostril searching area N is set by the nostril searching area setting portion 23, and then the nostril detecting portion 24 determines two neighboring dark parts existing within the nostril searching area N as the nostrils.

According to the embodiment, the eye searching portion searches the eye from the bottom to the top of the face image under a predetermined condition.

According to the embodiment, the eye searching portion searches the eye from the top to the bottom of the face image under the predetermined condition.

According to the embodiment, the eye detecting device 1 further includes the lower eyelid detecting portion 26 and the upper eyelid detecting portion 27 as the eye searching portion. The lower eyelid detecting portion 26 detects the vertically changing edge, whose luminance changes from bright to dark in the direction from bottom to top of the face image, by searching the eye searching area E, which is set by the eye searching area setting portion 25, from the top thereof. The lower eyelid detecting portion 26 determines the first vertically changing edge fulfilling the predetermined condition as the lower eyelid. Further the upper eyelid detecting portion 27 determines the vertically changing edge, whose luminance changes from dark to bright in the direction from bottom to top of the face image and exists in the area above the detected lower eyelid, as the upper eyelid.

According to the embodiment the eye detecting device 1 further includes the upper eyelid detecting portion 27 and the lower eyelid detecting portion 26 as the eye searching portion. The upper eyelid detecting portion 27 detects the vertically changing edge, whose luminance changes from bright to dark in the direction from top to bottom of the face image, by searching the eye searching area E, which is set by the eye searching area setting portion 25, from the bottom thereof. The upper eyelid detecting portion 27 determines the first vertically changing edge fulfilling the predetermined condition as the upper eyelid. Further the lower eyelid detecting portion 26 determines the vertically changing edge, whose luminance changes from dark to bright in the direction from top to bottom of the face image and exists in an area below the detected upper eyelid, as the lower eyelid.

According to the embodiment, the eye detecting method includes the eye searching step for searching the eye from the bottom to the top of the face image under the predetermined condition within the eye searching area E set by the eye searching area setting step S5.

According to the embodiment, the eye detecting method includes the eye searching step for searching the eye from the top to the bottom of the face image under the predetermined condition within the eye searching area E set by the eye searching area setting step S5.

According to the embodiment, the program instructs the computer to function as the nostril searching area setting portion 23 for setting the area in the face image in which the nostril is supposed to exist as the nostril searching area N, and the determining means for determining the two neighboring dark parts existing within the nostril searching area N as the nostrils by searching the nostril searching area N, which is set by the nostril searching area setting portion 23, under a predetermined condition.

According to the embodiment, the computer is functioned as the eye searching portion for searching the eye from the bottom to the top of the face image under the predetermined condition within the eye searching area E set by the eye searching area setting portion 25.

According to the embodiment, the computer is functioned as the eye searching portion for searching the eye from the top to the bottom of the face image under the predetermined condition within the eye searching area E set by the eye searching area setting portion 25.

According to the embodiment, the computer is functioned the lower eyelid detecting portion 26 and the upper eyelid detecting portion 27. The lower eyelid detecting portion 26 detects the vertically changing edge, whose luminance changes from bright to dark in the direction from bottom to top of the face image, by searching the eye searching area E set by the eye searching area setting portion 25 from the bottom thereof. The lower eyelid detecting portion 26 determines the first vertically changing edge fulfilling the predetermined condition as the lower eyelid. Further the upper eyelid detecting portion 27 determines the vertically changing edge, whose luminance changes from dark to bright in the direction from bottom to top of the face image and exists in the area above the detected lower eyelid, as the upper eyelid.

According to the embodiment, the computer is functioned as the upper eyelid detecting portion 27 and the lower eyelid detecting portion 26. The upper eyelid detecting portion 27 detects the vertically changing edge, whose luminance changes from bright to dark in the direction from top to bottom of the face image, by searching the eye searching area E set by the eye searching area setting portion 25 from the bottom thereof. The upper eyelid detecting portion 27 determines the first vertically changing edge fulfilling the predetermined condition as the upper eyelid. Further, the lower eyelid detecting portion 26 determines the vertically changing edge, whose luminance changes from dark to bright in the direction from top to bottom of the face image and exists in the area below the detected upper eyelid, as the lower eyelid.

Accordingly, the eye is quickly and accurately detected in the face image.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An eye detecting device comprising:
an image generating means for generating a face image;
a nostril detecting means for detecting a nostril in the face image;
an eye searching area setting means for setting an eye searching area in the face image based on a position of the nostril detected by the nostril detecting means; an eye searching means for searching an eye with the eye searching area set by the eye searching area setting means; and
a lower eyelid detecting means and an upper eyelid detecting means as the eye searching means,
wherein the lower eyelid detecting means detects a vertically changing edge, whose luminance changes from bright to dark in a direction from bottom to top of the face image, by searching the eye searching area, which is set by the eye searching area setting means, from a top thereof, the lower eyelid detecting means determines a first vertically changing edge fulfilling a predetermined condition as a lower eyelid, and the upper eyelid detecting means determines a vertically changing edge, whose luminance changes from dark to bright in the direction from bottom to top of the eye searching area and exists in an area above the detected lower eyelid, as an upper eyelid.

2. An eye detecting device comprising:
an image generating means for generating a face image;
a nostril detecting means for detecting a nostril in the face image;
an eye searching area setting means for setting an eye searching area in the face image based on a position of the nostril detected by the nostril detecting means;
an eye searching means for searching an eye with the eye searching area set by the eye searching area setting means; and
an upper eyelid detecting means and a lower eyelid detecting means as the eye searching means,
wherein the upper eyelid detecting means detects a vertically changing edge, whose luminance changes from bright to dark in a direction from top to bottom of the face image, by searching the eye searching area, which is set by the eye searching area setting means, from a bottom hereof, the upper eyelid detecting means determines a first vertically changing edge fulfilling a predetermined condition as an upper eyelid, and the lower eyelid detecting means determines an vertically changing edge, whose luminance changes from dark to bright in the direction from top to bottom of the face image and exists in an area below the detected upper eyelid, as a lower eyelid.

3. A non-transitory computer-readable medium storing a program instructing a computer to function as:
   a nostril detecting means for detecting a nostril in a face image;
   an eye searching area setting means for setting an eye searching area in the face image based on a position of the nostril detected by the nostril detecting means;
   an eye searching means for searching an eye within the eye searching area set by the eye searching area setting means; and
   a lower eyelid detecting means and an upper eyelid detecting means which are included in the eye searching means,
   wherein the lower eyelid detecting means detects a vertically changing edge, whose luminance changes from bright to dark in a direction from bottom to top of the face image, by searching the eye searching area set by the eye searching area setting means from a bottom thereof the lower eyelid detecting means determines a first vertically changing edge fulfilling the predetermined condition as a lower eyelid, and the upper eyelid detecting means determines an vertically changing edge, whose luminance changes from dark to bright in the direction from bottom to top of the eye searching area and exists in an area above the detected lower eyelid, as un upper eyelid.

4. A non-transitory computer-readable medium storing a program instructing a computer to function as:
   a nostril detecting means for detecting a nostril in a face image;
   an eye searching area setting means for setting an eye searching area in the face image based on a position of the nostril detected by the nostril detecting means;
   an eye searching means for searching an eye within the eye searching area set by the eye searching area setting means; and
   as an upper eyelid detecting means and a lower eyelid detecting means which are included in the eye searching means,
   wherein the upper eyelid detecting means detects a vertically changing edge, whose luminance changes from bright to dark in a direction from top to bottom of the face image, by searching the eye searching area set by the eye searching area setting means from a bottom thereof, the upper eyelid detecting means determines a first vertically changing edge fulfilling a predetermined condition as an upper eyelid, and the lower eyelid detecting means determines an vertically changing edge, whose luminance changes from dark to bright in the direction from top to bottom of the face image and exists in an area below the detected upper eyelid, as a lower eyelid.

5. The eye detecting device according to claim 1, further including a nostril searching area setting means for setting an area in the face image in which a nostril is supposed to exist as a nostril searching area,
   wherein the nostril detecting means searches the nostril within the nostril searching area under a predetermined condition, the nostril searching area is set by the nostril searching area setting means, and then the nostril detect means determines two neighboring dark parts existing within the nostril searching area as the nostrils.

6. The eye detecting device according to claim 1, wherein the eye searching means searches the eye from a bottom to a top of the face image under a predetermined condition.

7. The eye detecting device according to claim 2, wherein the eye searching means searches the eye from a top to a bottom of the face image under a predetermined condition.

8. The non-transitory computer-readable medium according to claim 3, the program further instructing the computer to function as: a nostril searching area setting means for setting an area in the face image in which the nostril is supposed to exist as a nostril searching area; and a determining means for determining two neighboring dark parts existing within the nostril searching area as the nostrils by searching the nostril searching area, which is set by the nostril searching area setting means, under a predetermined condition.

9. The non-transitory computer-readable medium according to claim 3, wherein the computer is functioned as the eye searching means for searching the eye from a bottom to a top of the face image under a predetermined condition within the eye searching area set by the eye searching area setting means.

10. The non-transitory computer-readable medium according to claim 4, wherein the computer is functioned as the eye searching means for searching the eye from a top to a bottom of the face image under a predetermined condition within the eye searching area set by the eye searching area setting means.

11. The eye detecting device according to claim 2, further including a nostril searching area setting means for setting an area in the face image in which a nostril is supposed to exist as a nostril searching area,
   wherein the nostril detecting means searches the nostril within the nostril searching area under a predetermined condition, the nostril searching area is set by the nostril searching area setting means, and then the nostril detect means determines two neighboring dark parts existing within the nostril searching area as the nostrils.

12. The non-transitory computer-readable medium according to claim 4, the program further instructing the computer to function as: a nostril searching area setting means for setting an area in the face image in which the nostril is supposed to exist as a nostril searching area; and a determining means for determining two neighboring dark parts existing within the nostril searching area as the nostrils by searching the nostril searching area, which is set by the nostril searching area setting means, under a predetermined condition.

* * * * *